United States Patent
Kang

(10) Patent No.: US 10,753,485 B2
(45) Date of Patent: Aug. 25, 2020

(54) CONTENT EXHAUST PUMP

(71) Applicant: Seong Il Kang, Seongnam-si (KR)

(72) Inventor: Seong Il Kang, Seongnam-si (KR)

(*) Notice: Subject to any disclaimer, the term of this patent is extended or adjusted under 35 U.S.C. 154(b) by 140 days.

(21) Appl. No.: 16/061,833

(22) PCT Filed: Sep. 28, 2016

(86) PCT No.: PCT/KR2016/010838
§ 371 (c)(1),
(2) Date: Jun. 13, 2018

(87) PCT Pub. No.: WO2017/111263
PCT Pub. Date: Jun. 29, 2017

(65) Prior Publication Data
US 2019/0323614 A1    Oct. 24, 2019

(30) Foreign Application Priority Data
Dec. 24, 2015  (KR) .................. 10-2015-0186676

(51) Int. Cl.
*F16K 7/17*        (2006.01)
*A47K 5/12*        (2006.01)
*B65D 47/20*       (2006.01)

(52) U.S. Cl.
CPC .............. *F16K 7/17* (2013.01); *A47K 5/1215* (2013.01); *B65D 47/2081* (2013.01)

(58) Field of Classification Search
CPC ........... F16K 7/17; A47K 5/1215; A47K 5/12; B65D 47/2081; B65D 83/00; A45D 40/00; A45D 33/00; A45D 34/04; A45D 40/26
See application file for complete search history.

(56) References Cited

U.S. PATENT DOCUMENTS

2003/0155379 A1* 8/2003 Masuzzo ............... B05B 11/007
222/321.7
2004/0144806 A1* 7/2004 Shimada ............. B05B 11/0062
222/321.7

(Continued)

FOREIGN PATENT DOCUMENTS

JP      2002-002843 A    1/2002
KR      20-0427103 Y1    9/2006

(Continued)

*Primary Examiner* — David P Angwin
*Assistant Examiner* — Bob Zadeh
(74) *Attorney, Agent, or Firm* — Novick, Kim & Lee, PLLC; Jae Youn Kim

(57) ABSTRACT

The content exhaust pump is provided which includes a pump body fastened to a container, a cylinder as a cylindrical member having opened upper and lower portions of which an outer flange is screw-coupled to an inner circumferential surface of the pump body, and a elevating device which ascends and descends on the inner circumferential surface of the cylinder by a pushing operation of a push button, in which in a lower cylinder having an inner diameter smaller than that of the cylinder at the lower portion of the cylinder, a cylindrical fixing member having a projection formed on the upper outer circumferential surface, and a dome-shaped valve suspended and fixed to the projection of the cylindrical fixing member is provided, and the dome-shaped valve is a dome-shaped flexible member of which the lower portion is opened and the upper portion is convexly projected thereof.

3 Claims, 5 Drawing Sheets

(56) References Cited

U.S. PATENT DOCUMENTS

| | | | | |
|---|---|---|---|---|
| 2005/0279770 A1* | 12/2005 | Moretti | ............... | B05B 11/3023 |
| | | | | 222/321.7 |
| 2011/0278328 A1* | 11/2011 | Kang | .................. | B05B 11/3023 |
| | | | | 222/340 |
| 2019/0323614 A1* | 10/2019 | Kang | ..................... | B65D 47/20 |

FOREIGN PATENT DOCUMENTS

| KR | 10-1233080 B1 | 2/2013 |
|---|---|---|
| KR | 10-2013-0096787 A | 9/2013 |
| KR | 20-2014-0006232 U | 12/2014 |
| WO | 2013-015621 A2 | 1/2013 |

\* cited by examiner

CONTENT EXHAUST PUMP

CROSS-REFERENCE TO RELATED APPLICATION(S)

This is a national stage application of PCT/KR2016/010838 under 35 U.S.C. 371, which claims benefit of priority to Korean Patent Application No. 10-2015-0186676 filed on Dec. 24, 2015 in the Korean Intellectual Property Office, the disclosure of which is incorporated herein by reference in its entirety.

BACKGROUND

1. Field

The present invention relates to a content exhaust pump, and more particularly, to a content exhaust pump capable of preventing a content from being degraded by improving a configuration of a pump body constituting an exhaust pump and a cylinder assembled with the pump body and exhausting the content with a dome-shaped flexible valve having a cross slit so that the content in a container is not in contact with external air when not in use.

2. Description of Related Art

Generally, an exhaust pump is provided in a container as a means for exhausting the contents of cosmetics, shampoos, detergents and the like in the container in an appropriate amount.

As such, an existing exhaust pump which is provided in the container and exhausts a small amount of content has been variously contrived. However, in a structure of a general exhaust pump, an opening and closing ball 122 for opening and closing a content introduction hole 125 and an operation piston 123 are provided to receive the elastic force of the spring 121, and a cylinder 120 is provided in a pump body 110 to exhaust the content in a content storage chamber 126 by a push button 140 by applying pressure to the content storage chamber 126 by the operation piston 123.

In the operation piston 123, a sealing piston 124 is further provided, and the push button 140 is provided in an operation pipe 130 fastened to the operation piston 123 of the cylinder 120.

In a conventional content exhaust pump having the above-described structure, when the push button 140 is pushed, a gap is first generated between the sealing piston 124 and the operation piston, and thereafter, while both the sealing piston 124 and the operation piston 123 move downward, the pressure is generated in the content storage chamber 126 and the content of the operation piston 123 are exhausted through a content transfer path 123a by the pressure as illustrated in FIG. 1.

In this case, the opening and closing ball 122 is in close contact with the content introduction path 125 by a compressed spring 121 to block the content introduction path 125.

As such, when the push button 140 is pushed to exhaust the content and then the external force applied to the push button 140 is released, both the operation piston 123 and the sealing piston 124 ascend by repulsive elastic force accumulated in the spring 121 as illustrated In FIG. 2.

The operation piston 123 and the sealing piston 124 ascending as described above block the content transfer path 123a while the operation piston 123 first ascends at an initial stage and the gap between the operation piston 123 and the sealing piston 124 is closed, and the elastic force accumulated in the spring 121 is weakened.

While the content transfer path 123a is blocked, the operation piston 123 and the sealing piston 124 continuously ascend and then vacuum pressure is generated in the content storage chamber 126. The opening and closing ball 122 is separated from the content introduction hole 125 by the vacuum pressure generated in the content storage chamber 126 such that the content in the container is introduced into the content storage chamber 126 again.

The conventional content exhaust pump exhausts the content while the operation is continuously repeated.

There is the biggest disadvantage of the conventional content exhaust pump in that since a spring as a repulsive means is made of a metallic material and an opening and closing means which is usable to exhaust the content is a metallic ball, the spring made of the metallic material and the metallic ball are corroded by the content to contaminate the content.

An exhaust pump in which the disadvantage of the aforementioned conventional exhaust pump is improved is disclosed in Korean Utility Model Registration No. 20-0427103 of "content exhaust pump structure" filled by the present applicant and registered.

In the prior Utility Model, an elastomer spring and a synthetic resin-made valve are used instead of the repulsive spring made of the metallic material and the metallic ball to prevent the degradation of the content by the corrosion. However, a content exhaust hole portion of a push button elevating member (first check valve), which is made of an elastomer material, is in direct contact with the content, so that an elastomer hardening phenomenon occurs at the portion which is in contact with the content, and it is impossible to exhaust the content in a fixed quantity, thereby lowering the reliability of a product. In addition, since the conventional content exhaust pump is made of a synthetic resin material and a metallic material, the content exhaust pump cannot be recycled when the product is completely used and collected separately, but needs to be discarded, and thus, it is not good for the environment.

Therefore, the present applicant has come to supplement and improve the prior registered Utility Model.

SUMMARY

The present invention is invented to meet the needs of the related art and the present invention has been made in an effort to provide a content exhaust pump capable of preventing a content from being degraded by improving a configuration of a pump body constituting an exhaust pump and a cylinder assembled with the pump body and exhausting the content with a dome-shaped flexible valve having a cross slit such that the content in a container is not in contact with external air when not in use.

According to a first exemplary embodiment of the present invention, there is provided a content exhaust pump comprising: a pump body 10 fastened to a container, a cylinder 20 as a cylindrical member having opened upper and lower portions of which an outer flange 21 is screw-coupled to an inner circumferential surface of the pump body 10, and an elevating device 30 which ascends and descends on the inner circumferential surface of the cylinder 20 by a pushing operation of a push button 40, in which an inner annular piece 11 located on the upper surface of the outer flange 21 of the cylinder 20 is inwardly projected on the inner circumferential surface of the cylindrical pump body 10, an annular packing 22 is inserted to a lower surface of the outer flange 21 of the cylinder 20 fastened to the pump body 10 so as to be in close contact with an upper inlet of the container, and an outer side surface is suspended by a band type protrusion 11a which is formed in a cylindrical shape and projected from the center of the inner circumferential surface of the inner annular piece 11 of the pump body 10, and a fixing member 23 covering the upper inner and outer surfaces of the cylinder 20 is provided.

The elevating device 30 may be constituted by a cylindrical sealing piston 31 which is in close contact with the inner circumferential surface of the cylinder 20, an operation cylinder rod 32 coupled to an inner circumferential surface of the sealing piston 31, an elevating rod 33 of which a lower end is coupled to an upper outer circumferential surface of the operation cylinder rod 32 and an upper end is coupled to the push button 40, and a cylindrical spring 34 which is provided at a lower end of a flange 33a projected outward from the central portion of the elevating rod 33 and an upper groove 23a of the fixing member 23 to be compressed and expanded according to the pushing operation of the push button 40.

In a lower cylinder 20a having an inner diameter smaller than that of the cylinder at the lower portion of the cylinder 20, a cylindrical fixing member 51 having a projection 51a formed on the upper outer circumferential surface thereof may be inserted to a boundary line between the cylinder 20 and the lower cylinder 20a, and a dome-shaped valve 52 suspended and fixed to the projection 51a of the cylindrical fixing member 51 may be provided.

The dome-shaped valve 52 may be a dome-shaped flexible member of which the lower portion is opened and the upper portion is convexly projected and have a cross slit 52a formed at the center of the upper surface thereof, and thus, when the push button 40 is pushed, the content is exhausted through the cross slit 52a while the inside of the container is compressed.

According to the content exhaust pump of the present invention, it is possible to prevent the content from being degraded by improving the configuration of the pump body 10 constituting the exhaust pump and the cylinder 20 assembled with the pump body 10 and simultaneously exhausting the content to the dome-shaped flexible valve having the cross slit such that the content in the container is not in contact with the external air when not in use.

DETAILED DESCRIPTION OF THE EXEMPLARY EMBODIMENTS

Hereinafter, a preferable embodiment of the present invention will be described in detail with reference to the accompanying drawings. Moreover, in describing the present invention, a detailed description of related known configurations or functions may be omitted to avoid obscuring the subject matter of the present invention.

Exemplary Embodiments

Figure 1:
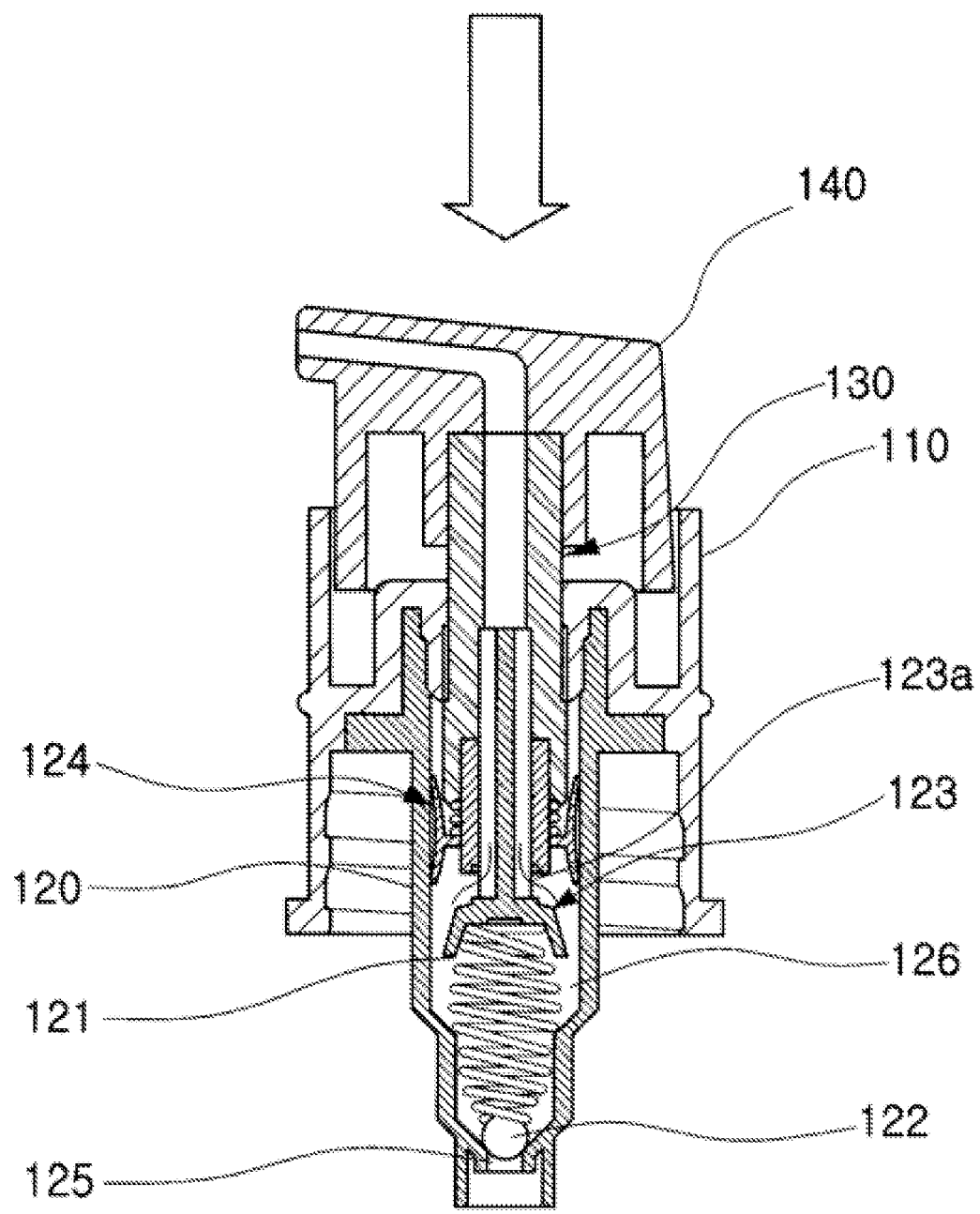
FIG. 1 is a cross-sectional view illustrating a state in which a content is exhausted by operating a content exhaust pump in the related art.
Figure 2:
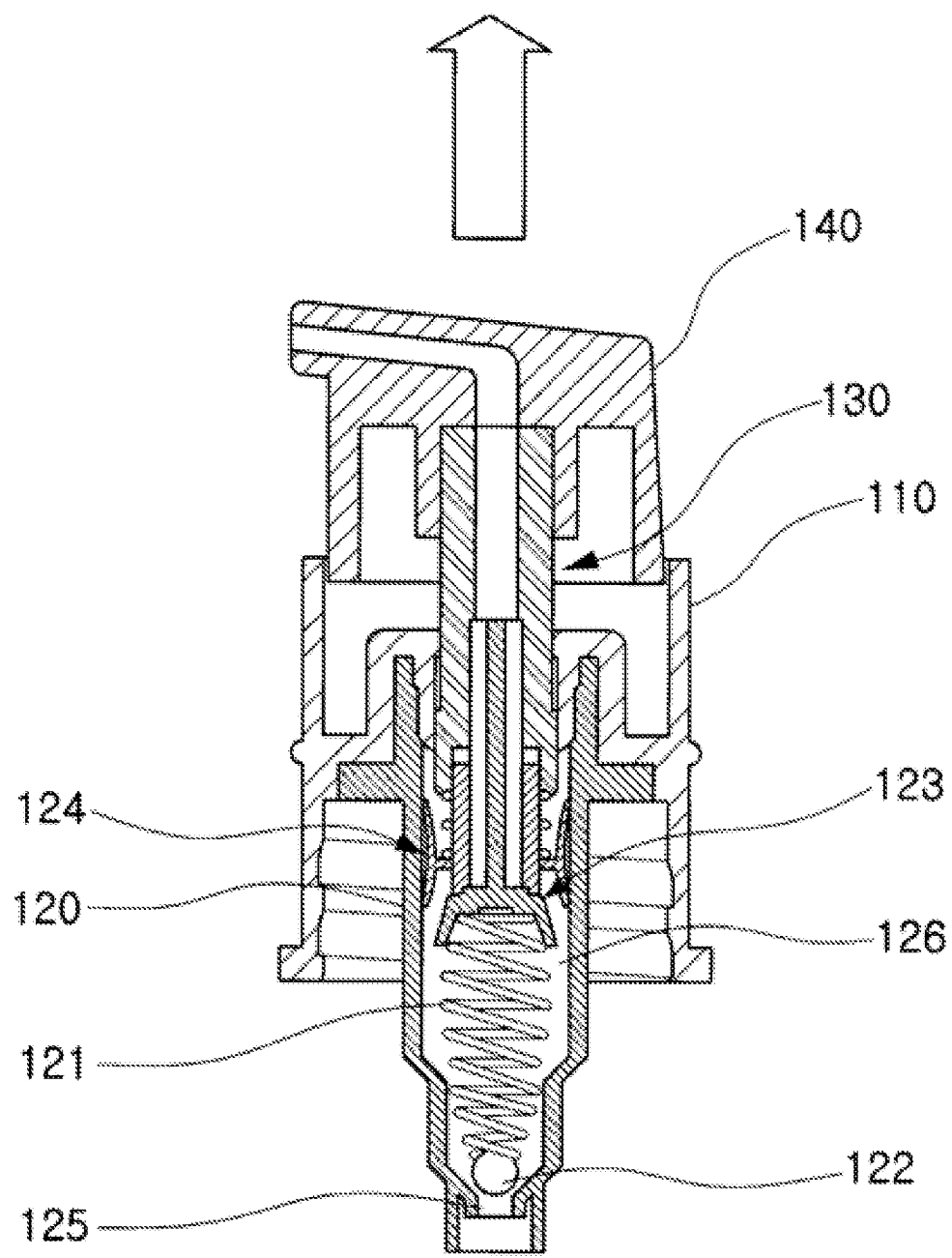
FIG. 2 is a cross-sectional view illustrating a state in which the force is removed from the content exhaust pump in the related art to be restored to an original state.
Figure 3:
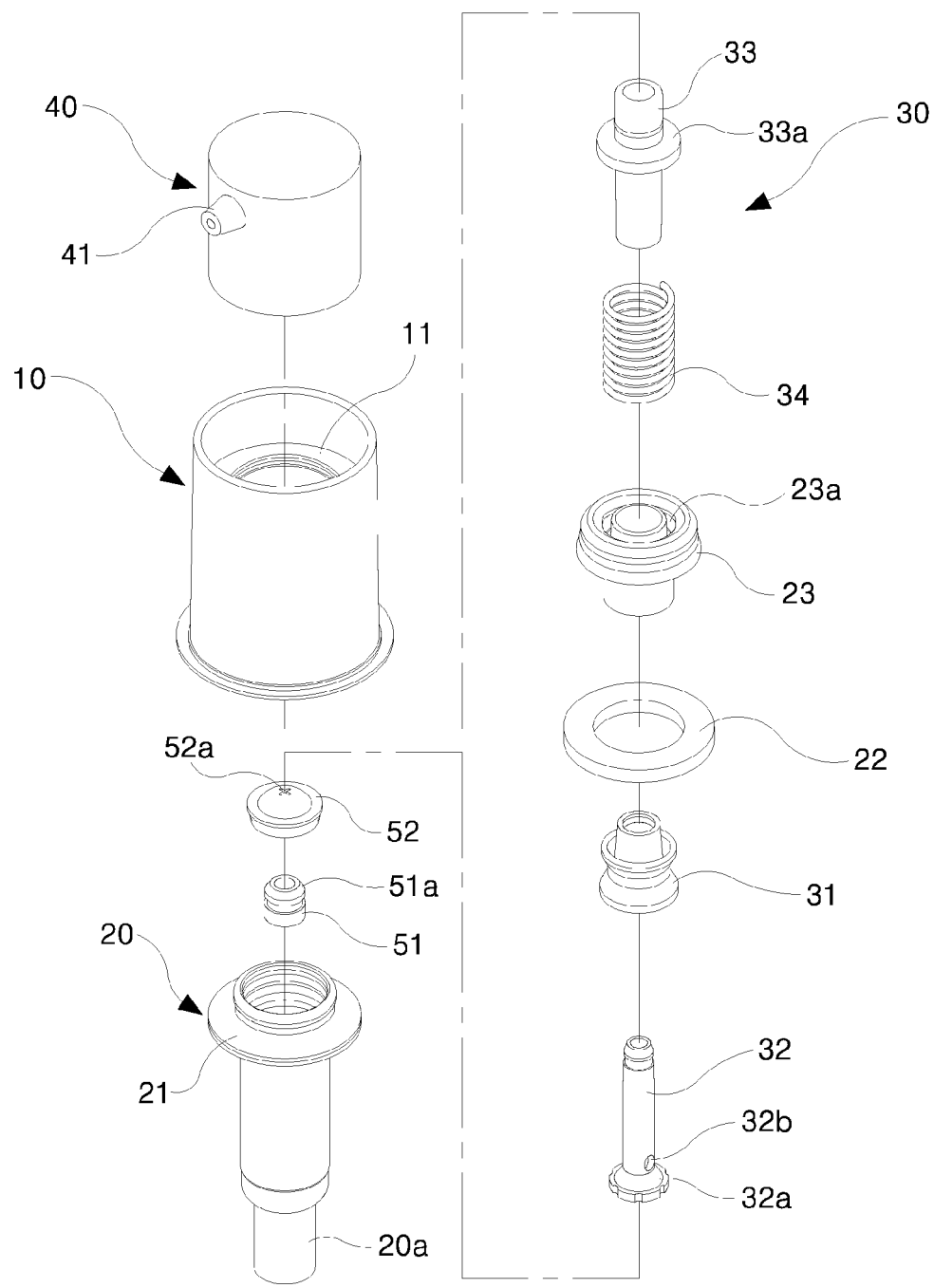
FIG. 3 is an exploded perspective view illustrating a content exhaust pump according to the present invention.
Figure 4:
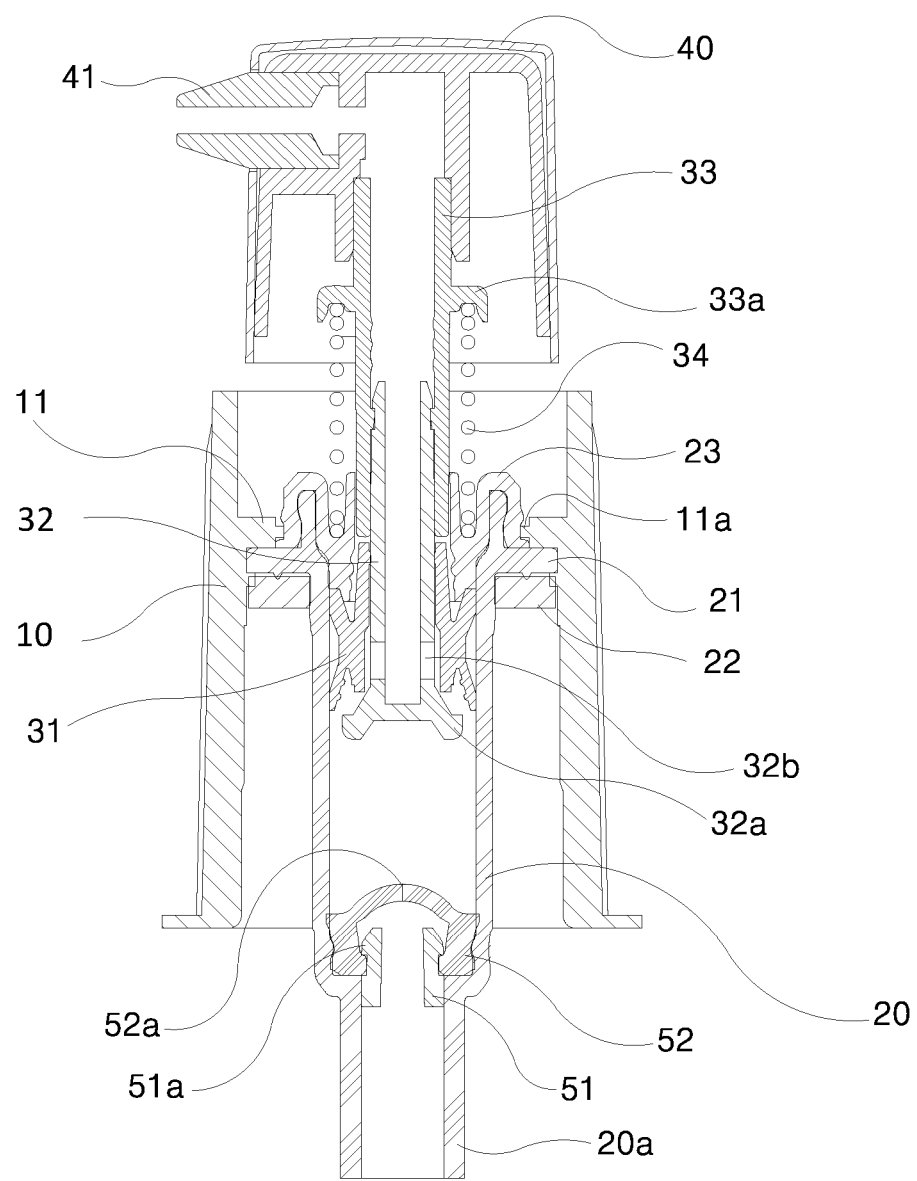
FIG. 4 is an assembly cross-sectional view illustrating a case where the content exhaust pump according to the present invention is not operated.
Figure 5:
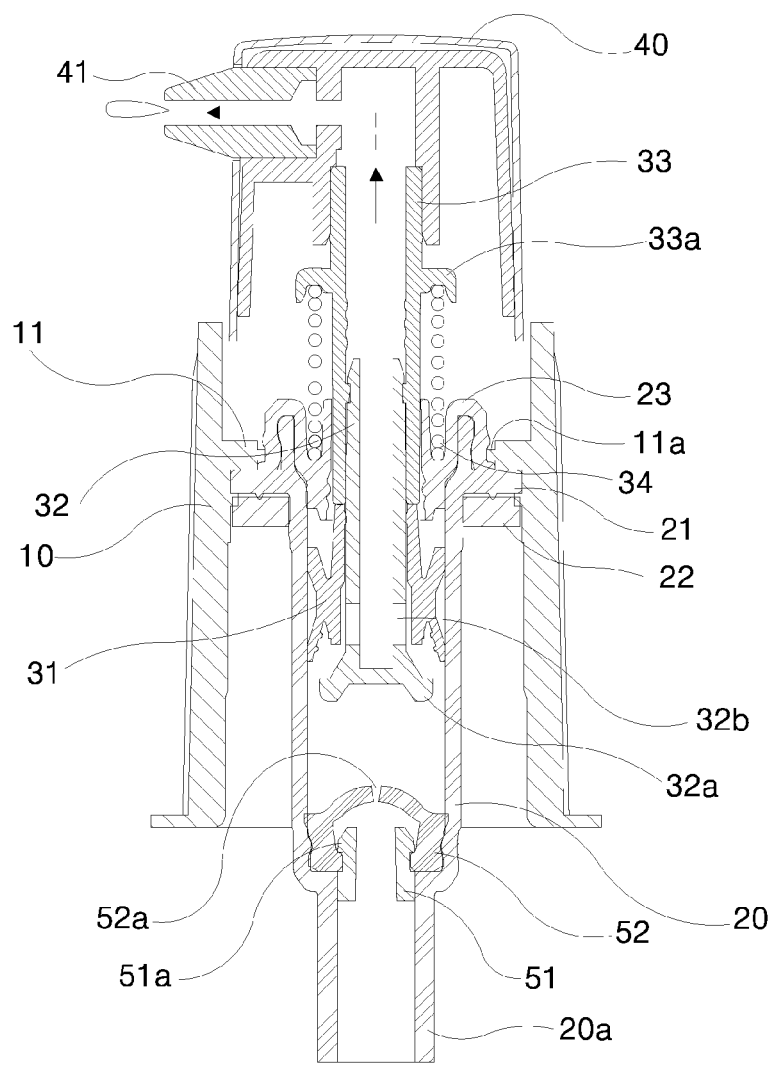
FIG. 5 is an assembly cross-sectional view illustrating a case where the content exhaust pump according to the present invention is operated.

As illustrated in FIGS. 3 to 5, a content exhaust pump according to the present invention includes a pump body 10 fastened to a container, a cylinder 20 as a cylindrical member having opened upper and lower portions of which an outer flange 21 is screw-coupled to an inner circumferential surface of the pump body 10, and an elevating device 30 which ascends and descends on the inner circumferential surface of the cylinder 20 by a pushing operation of a push button 40.

An inner annular piece 11 located on the upper surface of the outer flange 21 of the cylinder 20 is inwardly projected on the inner circumferential surface of the cylindrical pump body 10.

An annular packing 22 is inserted to a lower surface of the outer flange 21 of the cylinder 20 fastened to the pump body 10 so as to be in close contact with an upper inlet of the container, an outer side surface is suspended by a band type protrusion 11a which is formed in a cylindrical shape and projected from the center of the inner circumferential surface of the inner annular piece 11 of the pump body 10, and a fixing member 23 covering the upper inner and outer surfaces of the cylinder 20 is provided.

The elevating device 30 is constituted by a cylindrical sealing piston 31 which is in close contact with the inner circumferential surface of the cylinder 20, an operation cylinder rod 32 coupled to an inner circumferential surface of the sealing piston 31, an elevating rod 33 of which a lower end is coupled to an upper outer circumferential surface of the operation cylinder rod 32 and an upper end is coupled to the push button 40, and a cylindrical spring 34 which is provided at a lower end of a flange 33a projected outward from the central portion of the elevating rod 33 and an upper groove 23a of the fixing member 23 to be compressed and expanded by the pushing operation of the push button 40.

The operation cylinder rod 32 is a cylindrical member having an opened upper potion and a closed lower portion, and a lower portion has a lower projected part 32a formed to lift the sealing piston 31 when ascending and a transfer path 32b is horizontally formed through the upper portion of the lower projected part 32a.

In a lower cylinder 20a having an inner diameter smaller than that of the cylinder at the lower portion of the cylinder 20, a cylindrical fixing member 51 having a projection 51a formed on the upper outer circumferential surface thereof is inserted to a boundary line between the cylinder 20 and the lower cylinder 20a, and a dome-shaped valve 52 suspended and fixed to the projection 51a of the cylindrical fixing member 51 is provided.

The dome-shaped valve 52 has a dome shape of which the lower portion is opened and the upper portion is convexly projected and a cross slit 52a formed at the center of the upper surface thereof.

The dome-shaped valve 52 is a flexible member, and as illustrated in FIG. 5, when the push button 40 is pushed, the content is exhausted through the cross slit 52a while the inside of the container is compressed.

Next, in order to use the content exhaust pump container, when the push button 40 is pushed, the operation cylinder rod 32 descends in the cylinder 20 while the push button 40 descends. As illustrated in FIG. 5, while a space in the cylinder 20 is compressed, that is, decreased, the cross slit 52a formed on the upper surface of the dome-shaped valve 52 is separated such that the content in the container is introduced into the cylinder 20, and the introduced content is sucked through the center of the operation cylinder rod 32, introduced to the transfer path 32b of the operation cylinder rod 32, and exhausted to an exhaust nozzle 41 of the push button 40.

In addition, when the pushing of the push button 40 is released, the push button 40 ascends while the cylindrical spring 34 is expanded, and the cross slit 52a of the dome-shaped valve 52 is closed while the operation cylinder rod 32 also ascends. That is, the pressure in the cylinder 20 is released to be restored to the original state.

As described above, detailed exemplary embodiments have been described in the detailed description of the present invention, but a possibility that the technology of the present invention will be easily modified and executed by those skilled in the art is apparent and the modified exemplary embodiments will be included in the technical spirit disclosed in the appended claims of the present invention.

What is claimed is:

1. A content exhaust pump comprising:
a pump body fastened to a container;
a cylinder as a cylindrical member having opened upper and lower portions of which an outer flange is screw-coupled to an inner circumferential surface of the pump body; and
an elevating device which ascends and descends on an inner circumferential surface of the cylinder by a pushing operation of a push button,
wherein an inner annular piece located on an upper surface of the outer flange of the cylinder 20 is inwardly projected on the inner circumferential surface of the cylindrical pump body;
an annular packing is inserted to a lower surface of the outer flange of the cylinder fastened to the pump body so as to be in close contact with an upper inlet of the container; and
an outer side surface is suspended by a band protrusion which is formed in a cylindrical shape and projected from a center of an inner circumferential surface of the inner annular piece of the pump body, and a fixing member covering upper inner and outer surfaces of the cylinder is provided,
wherein the elevating device includes:
a cylindrical sealing piston which is in close contact with the inner circumferential surface of the cylinder;
an operation cylinder rod coupled to an inner circumferential surface of the sealing piston;
an elevating rod of which a lower end is coupled to an upper outer circumferential surface of the operation cylinder rod and an upper end is coupled to the push button; and
a cylindrical spring which is provided at a lower end of a flange projected outward from a central portion of the elevating rod and an upper groove of the fixing member to be compressed and expanded by the pushing operation of the push button.

2. The content exhaust pump of claim 1, further comprising:
a lower cylinder having an inner diameter smaller than that of the cylinder connected at the lower portion of the cylinder, wherein a cylindrical fixing member 51 having a projection 51a formed on an upper outer circumferential surface thereof is inserted to a boundary line between the cylinder and the lower cylinder; and
a dome-shaped valve suspended and fixed to the projection of the cylindrical fixing member.

3. The content exhaust pump of claim 2, wherein the dome-shaped valve is a dome-shaped flexible member of which a lower portion is opened and an upper portion is convexly projected and has a cross slit formed at a center of the upper surface thereof, and when the push button is pushed, the content is exhausted through the cross slit while an inside of the container is compressed.

* * * * *